(12) United States Patent
Melton et al.

(10) Patent No.: US 7,461,454 B2
(45) Date of Patent: Dec. 9, 2008

(54) METHOD OF FABRICATING A HOUSING ASSEMBLY

(75) Inventors: Patrick B. Melton, Horseshoe, NC (US); Jack R. McKenzie, Hendersonville, NC (US)

(73) Assignee: Arvin Technologies, Troy, MI (US)

( * ) Notice: Subject to any disclaimer, the term of this patent is extended or adjusted under 35 U.S.C. 154(b) by 256 days.

(21) Appl. No.: 10/356,016

(22) Filed: Jan. 31, 2003

(65) Prior Publication Data

US 2004/0149078 A1 Aug. 5, 2004

(51) Int. Cl.
B21D 53/90 (2006.01)

(52) U.S. Cl. .................. 29/897.2; 74/607

(58) Field of Classification Search .......... 74/606 R, 74/607; 29/897.2, 434; 228/112.1, 2.1, 193
See application file for complete search history.

(56) References Cited

U.S. PATENT DOCUMENTS

| 1,903,146 | A | * | 3/1933 | Sterling | 74/607 |
|---|---|---|---|---|---|
| 2,015,969 | A | * | 10/1935 | Schildknecht | 74/607 |
| 2,153,287 | A | * | 4/1939 | Wallace et al. | 74/607 |
| 3,213,531 | A | | 10/1965 | Wylie | |
| 3,269,214 | A | * | 8/1966 | Nagel | 74/607 |
| 3,793,703 | A | * | 2/1974 | Winkler et al. | 29/463 |
| 4,756,466 | A | * | 7/1988 | Peck | 228/165 |
| 4,760,755 | A | | 8/1988 | Peck | |
| 4,787,267 | A | | 11/1988 | Kessler et al. | |
| 4,843,906 | A | * | 7/1989 | Kuwahara | 74/607 |
| 5,271,294 | A | * | 12/1993 | Osenbaugh | 74/607 |
| 5,303,985 | A | | 4/1994 | Barnholt et al. | |
| 5,406,819 | A | | 4/1995 | Wang et al. | |
| 5,584,773 | A | * | 12/1996 | Kershaw et al. | 475/160 |
| 6,032,967 | A | * | 3/2000 | Ogoniek | 280/124.175 |
| 6,609,649 | B1 | * | 8/2003 | Barnholt et al. | 228/171 |

FOREIGN PATENT DOCUMENTS

JP 200238503 9/2000

OTHER PUBLICATIONS

International Search Report for Spanish Application No. 200400155 dated Sep. 6, 2006.

* cited by examiner

*Primary Examiner*—Vicky A Johnson
(74) *Attorney, Agent, or Firm*—Carlson, Gaskey & Olds

(57) ABSTRACT

An axle assembly includes an upper and lower housing joined to form a chamber for a differential gear assembly. The upper and lower housings are fabricated by a method including the steps of forming the upper housing from a first sheet of material and forming the lower housing from a second sheet of material. The upper housing includes an opening for the differential gear assembly and the lower housing includes a bowl portion disposed opposite the opening. The upper and lower housings are joined by a weld to from the axle housing. The lower housing includes leg portions that form a single unified structure with the bowl portion to improve structural rigidity and simplify assembly.

26 Claims, 4 Drawing Sheets

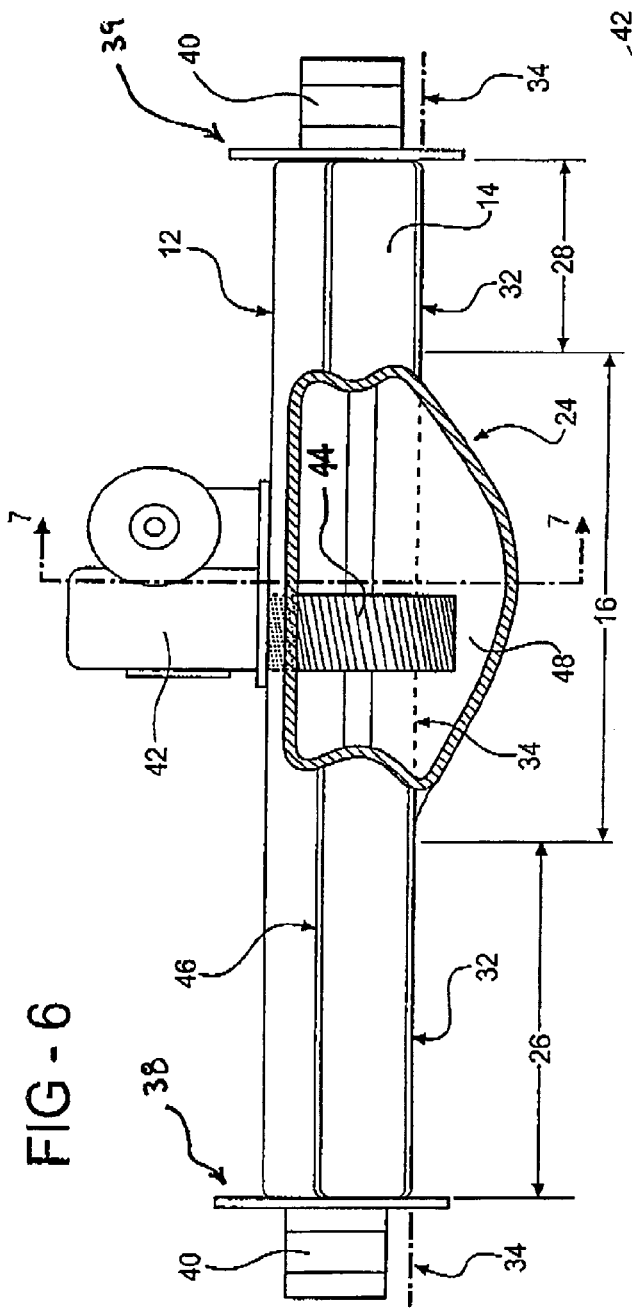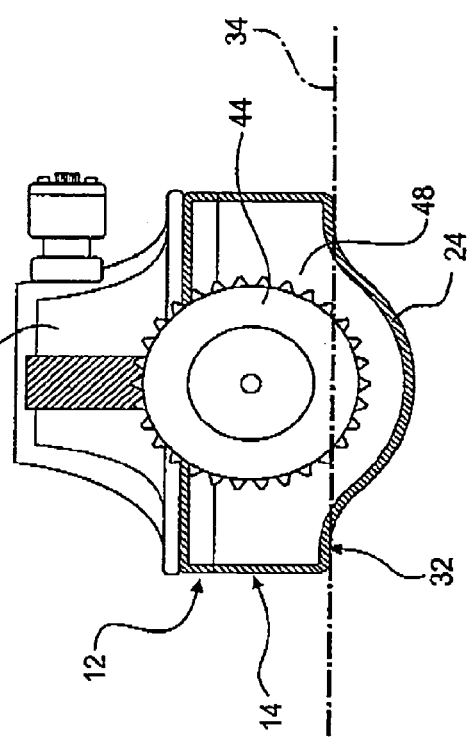

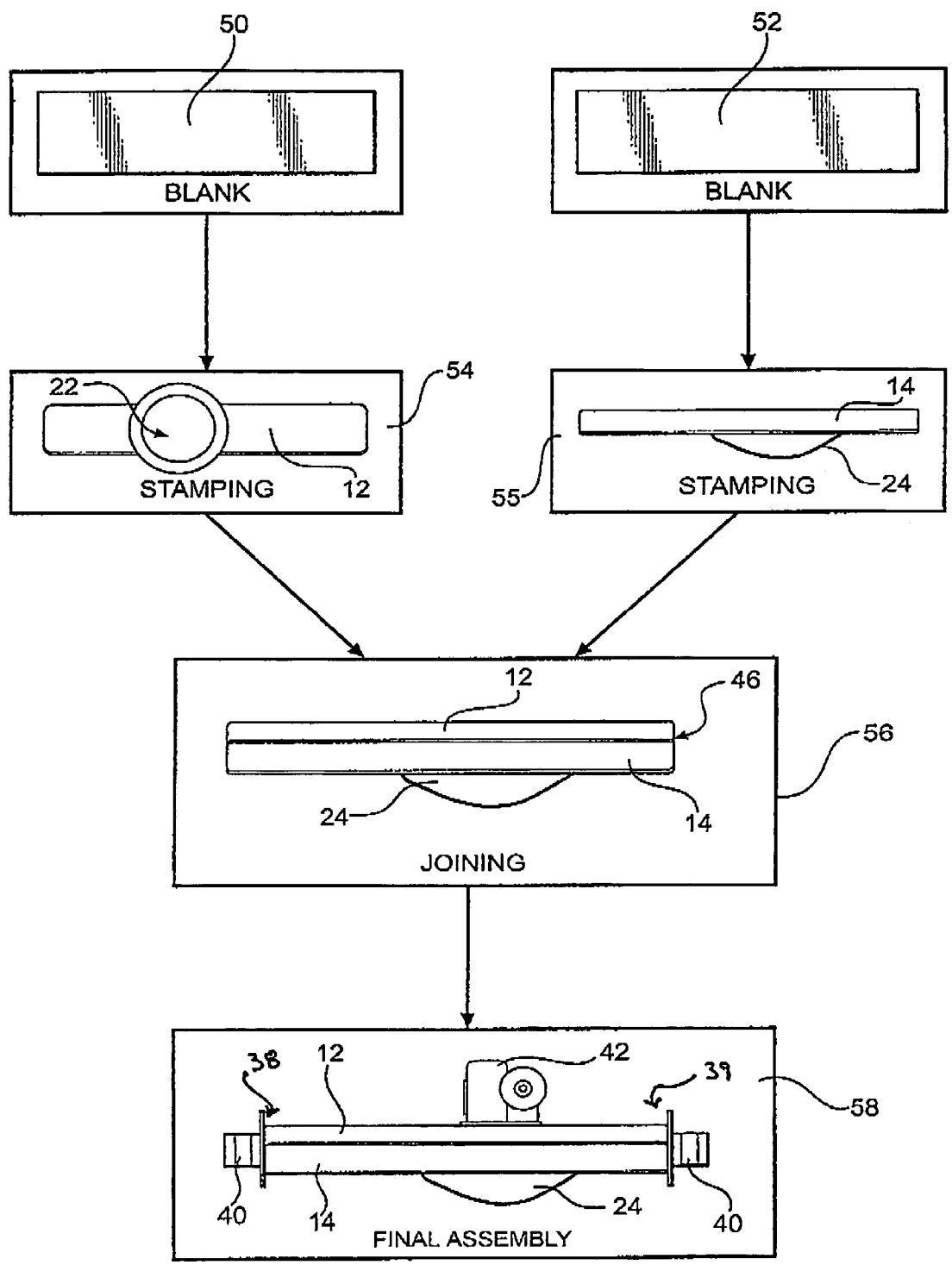

METHOD OF FABRICATING A HOUSING ASSEMBLY

BACKGROUND OF THE INVENTION

This invention generally relates to a method of fabricating an axle housing assembly, and specifically to a method of fabricating an axle housing assembly having a lower housing defining a bowl portion enclosing a differential gear assembly.

Conventional axle housings are fabricated utilizing various processes including casting, forging and stamping. Stamping processes have several advantages over other known processes such as cost efficiencies, strength and adaptability to various desired configurations. Conventional fabrication processes for stamped axle housings begin with a specially sized and shaped blank of steel. The blank size and shape corresponds with progressive stamping dies that shape and form the blank into a completed section of the housing.

Typically, axle housings fabricated from a stamping process include first and second housing halves fabricated separately and joined by welding. The first and second housing halves form leg sections extending from a differential mounting section. Axle shafts are supported within each leg section and are connected to a differential gear assembly mounted within the mounting section. The mounting section is formed by the joined first and second housing halves to form upper and lower halves of a substantially circular opening. The differential gear assembly is mounted to the housing assembly such that a gear extends into the opening to engage the axle shafts.

The gear is of a larger diameter than is capable of being completely enclosed within the two joined housing halves. A cover attached to the housing at the mounting section covers the portion of the gear extending from the axle housing. The cover is a separate piece attached to the housing assembly. As appreciated, additional parts contribute to additional cost, and require additional assembly steps. Further, the joint between the cover and the axle housing creates an additional potential leak path for lubricant contained within the axle housing.

Accordingly, it is desirable to develop an axle housing assembly and method of fabricating an axle housing that, reduces the costs and the number of assembly operations.

SUMMARY OF INVENTION

An embodiment of this invention is a method of fabricating an axle housing assembly including the steps of forming an upper housing from a first sheet of material and a lower housing including a bowl portion from a second sheet of material.

The upper housing includes an upper mount section having an opening to receive a differential gear assembly. The lower housing includes a lower mount section including a bowl portion. The lower housing includes first and second leg portions extending from the lower mount section. The bowl portion and first and second leg portions form a single unified part. The upper and lower housings are joined along a seam by a weld to form a complete housing defining a gear assembly chamber. The lower housing is a single unified part having a bowl portion disposed opposite the opening within the upper housing. The bowl portion increases rigidity of the lower housing that in turn strengthens the entire housing assembly. The structural rigidity of the unified lower housing is increased because the bowl portion is thicker and includes a slightly elongated spherical shape. Further, the unified configuration of the lower housing eliminates additional parts and joints. The elimination of unnecessary joints reduces potential leak paths and increases structural rigidity.

Accordingly, the axle housing assembly fabricated according to this invention includes a single unified lower housing section including the bowl portion enclosing the differential gear assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 6 is partial sectional view of the axle housing assembly;

FIG. 7 is a cross-sectional view of the housing assembly with the installed differential gear assembly; and FIG. 8 is a schematic representation of fabrication of an axle housing according to this invention.

DETAILED DESCRIPTION OF THE PREFERRED EMBODIMENT

Figure 1:
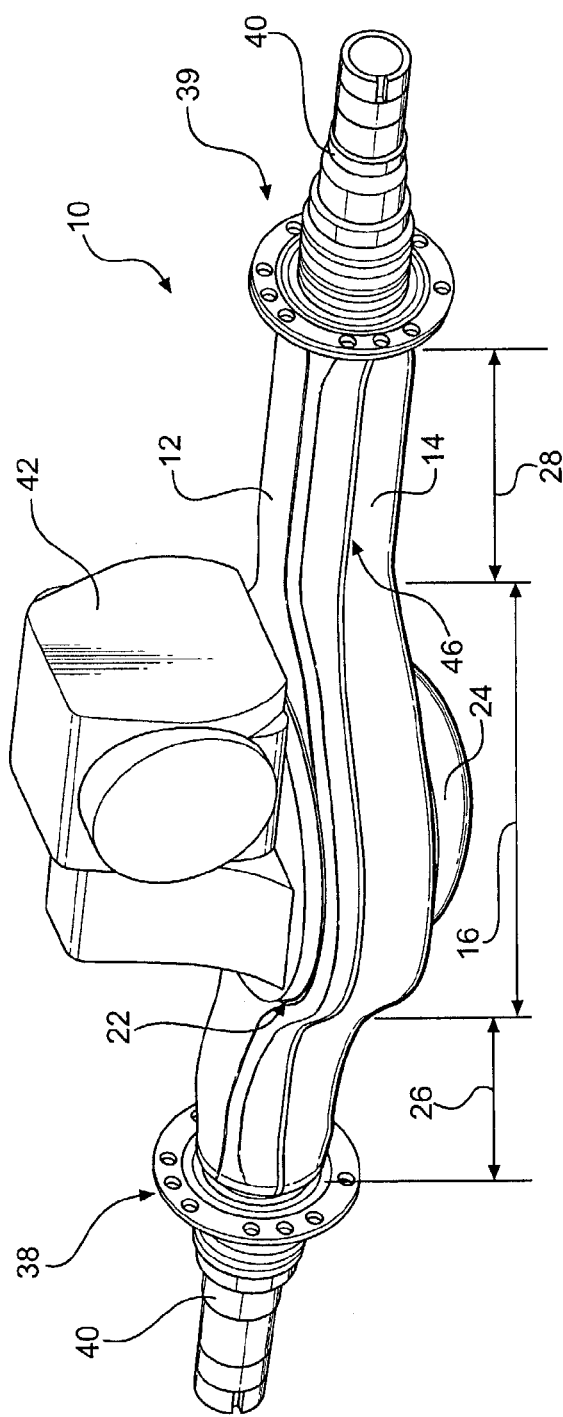
FIG. 1 is a perspective view of an axle housing assembly with a differential gear assembly.
Figure 2:
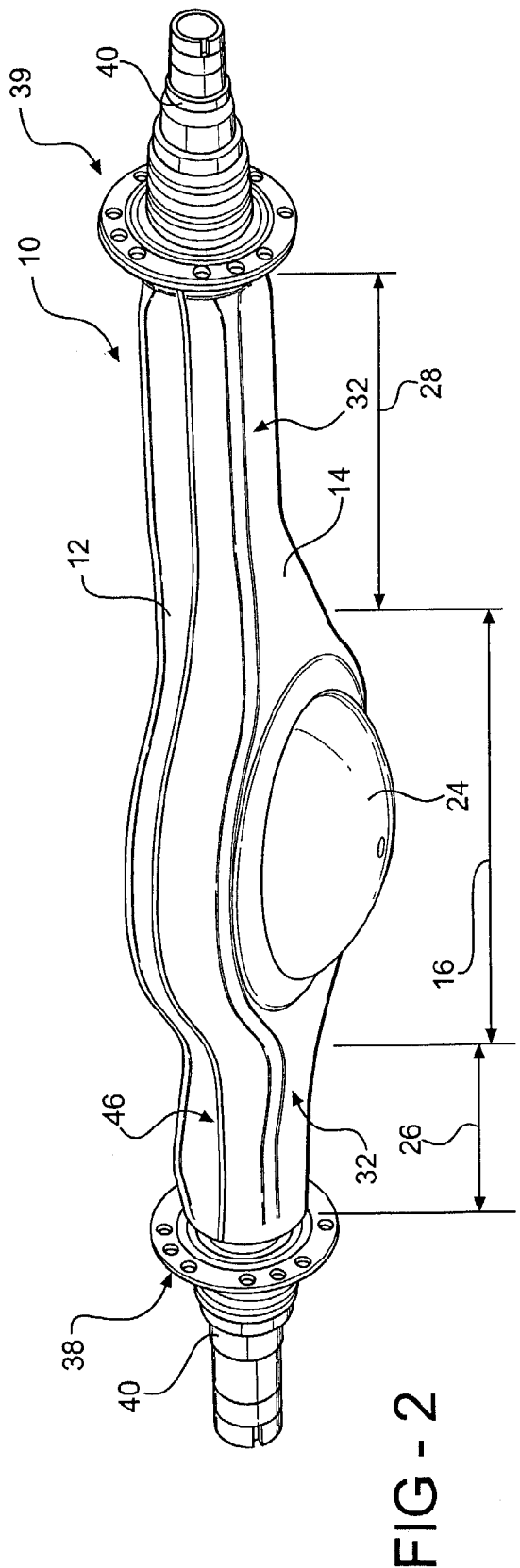
FIG. 2 is a perspective view of the axle housing assembly without the differential gear assembly.

Referring to FIGS. 1 and 2, an axle housing assembly 10 includes an upper housing 12 and a lower housing 14. The upper housing 12 includes an opening 22, best shown in FIG. 4, and is formed from a single sheet of material. The lower housing 14 is joined to the upper housing 12 and is formed from a second sheet of material. The lower housing 14 includes a bowl portion 24 disposed opposite the opening 22. A differential gear assembly 42, shown schematically, mounts to the upper housing 12 and includes a gear 44 (FIG. 6) extending through the opening 22 and into the bowl portion 24.

Although upper and lower housings 12, 14 are shown and described, the specific orientation of each part of the housing assembly 10 can vary according to specific application requirements. Furthermore, although a top mounted differential gear assembly 42 is shown, it should be understood that it is within the contemplation of this invention to construct housing assemblies for face or side mounted gear assemblies.

The housing assembly 10 includes a mount portion 16 for the differential gear assembly 42. The mount portion 16 may be an expanded area located at or adjacent a central point within the axle housing assembly 10. First and second leg portions 26,28 extend from either side of the mount portion 16 to form elongated chambers for axle shafts driven by the differential gear assembly 42. The mount portion 16 may be centrally located such that the first and second leg portions 26,28 are of equal length or as shown adjacent the mount portion 16 such that the second leg portion 28 is longer than the first leg portion 26.

The first and second leg portions 26, 28 terminate at first and second ends 38, 39 respectively. The first and second ends 38,39 of each of the upper and lower housings 12, 14 include a generally C-shaped cross-section 36 (FIGS. 3 and 4) that are joined to form substantially circular ends. A wheel mount assembly 40 is mounted to the first and second ends 38, 39. The wheel mount assemblies 40 are of any known configuration.

The upper and lower housing 12,14 are joined along a welded seam 46 extending along the entire length of the axle housing assembly 10. The upper and lower housings 12, 14 are welded along the seam 46 to provide a structurally rigid axle housing assembly 10. The specific welding process is as known. Further, the seam 46 is configured according to known techniques to accommodate application specific requirements for durability, strength and rigidity.

Figure 3:
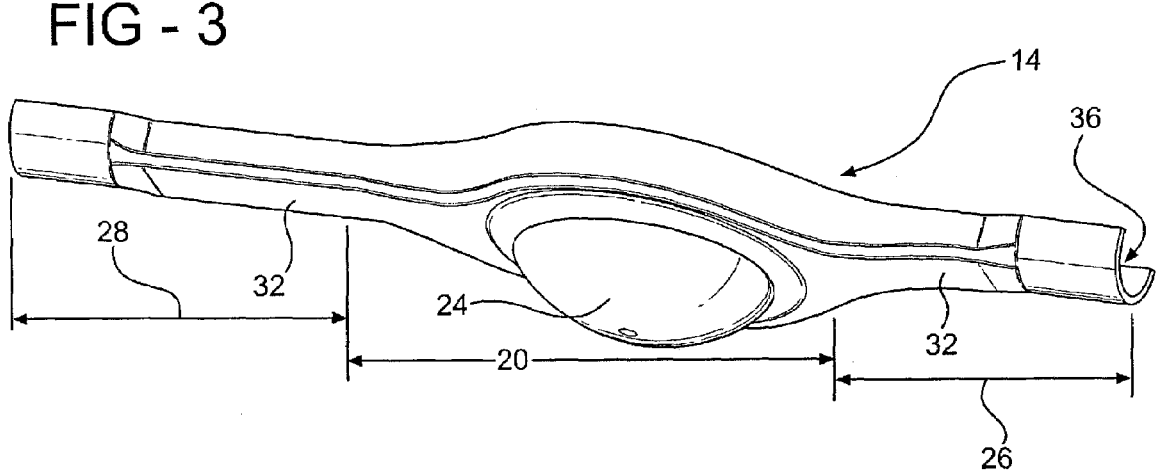
FIG. 3 is a perspective view of a lower housing.
Figure 4:
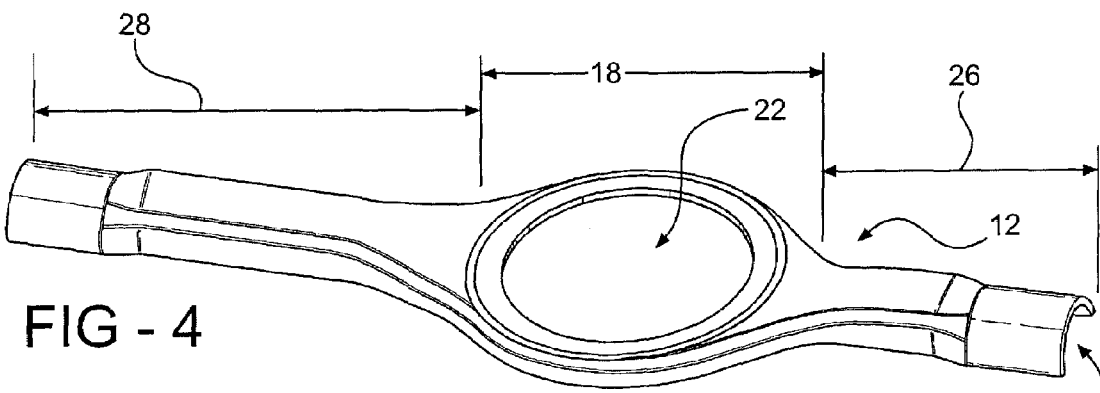
FIG. 4 is a perspective view of an upper housing.
Figure 5:
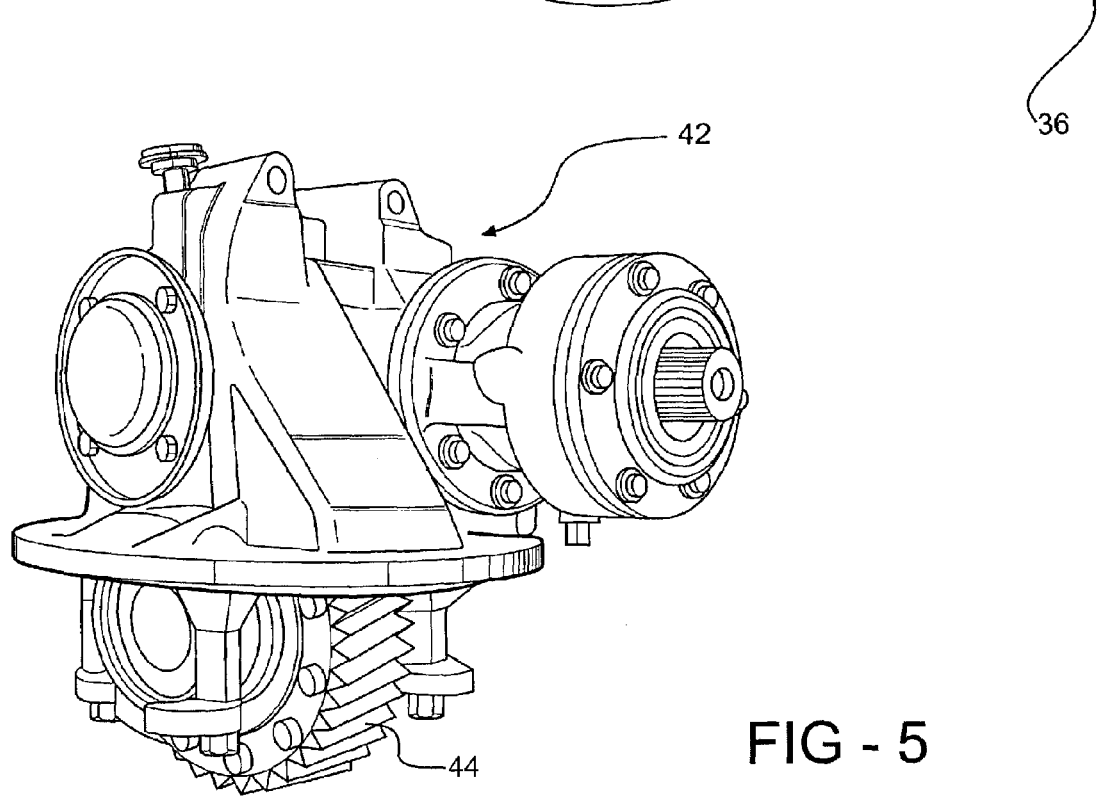
FIG. 5 is a perspective view of a differential gear assembly.

Referring to FIGS. 3-5, the upper housing 12 is formed from a first single sheet of material or blank. The sheet of material is of a shape corresponding with subsequent stamping operations to form the final desired shape of the upper housing 12. From the original sheet of material, the configuration of the upper housing 12 is stamped utilizing known processes. The upper housing 12 includes an upper mount section indicated at 18 to differentiate it from the assembled mount portion 16 in FIGS. 1 and 2. The upper mount section 18 includes the opening 22 into which the differential gear assembly 42 is installed. The upper mount section 18 is generally circular and accommodates installation of the differential gear assembly 42. The upper housing 12 is a single unified piece that provides an upper half of the first and second leg portions 26, 28.

The lower housing 14 is stamped from a second single sheet or blank. The original sheet of material is of a size and configuration that corresponds to subsequent stamping operations to progressively form the completed lower housing 14. The lower housing 14 includes a lower mount section indicated at 20 to differentiate from the assembled mount portion indicated at 16. The bowl portion 24 is disposed within the lower mount section 20. The bowl portion 24 is part of the single unified lower housing 14. The lower housing 14 provides a lower portion of the first and second leg portions 26, 28. The unified construction of the lower housing 14 eliminates the need for a separate cover to enclose the differential gear assembly 42 within the completed housing assembly 10.

Further, the bowl portion 24 of the lower housing 14 strengthens the overall structure of the completed housing assembly 10 by eliminating the joint required by a separate cover attached to the lower housing 14. In addition to the increased rigidity provided by the unified construction of the lower housing 14, the reduction of seams and joints eliminates potential leakage paths from the completed axle housing assembly 10.

Referring to FIGS. 6 and 7, the unified bowl portion 24 provides the additional required clearance for the gear 44 of the differential gear assembly 42. The lower housing 14 includes a surface 32 that defines a plane 34 extending through the bowl portion 24. The surface 32 is continuous through the mount portion 16 to distal ends of the first and second leg portions 26 and 28 that extend toward the wheel mount assemblies 40 attached to the first and second ends 38, 39. The surface 32 smoothly transitions from the more planer surfaces at the leg portions 26, 28 through the bowl portion 24. The transition from the surface 32 into the bowl portion 24 is continuous and does not include seams or other surface interruptions.

The upper and lower housings 12,14 form a chamber 48 into which the gear 44 extends. The bowl portion 24 extends the chamber 48 beyond the plane 34 defined by surfaces 32 such that the gear 44 is enclosed within the upper and lower housings 12,14. The chamber 48 for the gear 44 is formed by the upper and lower housings 12, 14 without additional sections or parts. The gear 44 is enclosed within the axle housing assembly 10 once mounted to the upper housing 12.

The bowl portion 24 is preferably spherically shaped and transitions from the planar surface 32 to a full depth of the chamber 48 accommodating gear 44. The spherical shape of the bowl portion 24 may also be elongated to reduce stress on the housing assembly 10. FIG. 7 illustrates the slightly elongated configuration of the bowl portion 24. As appreciated, the depth and configuration of the bowl portion 24 and the corresponding chamber 48 is specifically configured to accommodate the specific differential gear assembly 42 required for a specific application. Although shown schematically, as known the differential gear assembly 42 drives the wheel mount assemblies to rotate drive wheels (Not shown). The single unified structure of the lower housing 14, including the bowl portion 24, decreases the number of parts required to complete the axle housing assembly 10 and the number of operations required for assembly.

Referring to FIG. 8, a method of fabricating the axle housing assembly 10 is schematically shown and includes the initial step of providing a first sheet of material 50 configured and sized to produce the upper housing 12. The configuration of the first sheet of material 50 or blank corresponds with the specific stamping process utilized and the overall final desired configuration of the upper housing 12. A second sheet of material 52 is configured to correspond with stamping operations required to form the lower housing 14. A worker skilled in the art would understand the configuration required for the first and second sheets of material 50,52 to accomplish the desired final configuration of the upper and lower housings 12, 14. Preferably, the material comprising the first and second sheets of material 50,52 is a steel possessing specific material properties of ductility, and strength desired for the housing assembly 10.

The subsequent stamping operations performed indicated at 54 and 55 are conducted to provide the final configuration of the upper and lower housings 12, 14. The stamping operation 54 forming the upper housing 12 includes formation of the opening 22. The stamping operation 55 forming the lower housing 14 includes formation of the bowl portion 24.

The subsequent stamping operations performed indicated at 54 and 55 are Conducted to provide the final configuration of the upper and lower housings 12, 14. The stamping operation 54 forming the upper housing 12 includes formation of the Opening 22. The stamping operation 55 forming the lower housing 14 includes formation of the bowl portion 24.

The upper and lower housings 12, 14 are then joined as indicated at 56 by a weld along the seam 46. The base structure of the axle housing assembly 10 is complete after the upper and lower housings 12, 14 are joined because the lower housing 14 includes the unified bowl portion 24. The chamber 48 formed between the upper and lower housings 12, 14 is complete upon completion of the joining operations 56.

Final assembly is indicated at 58 and includes installation of the differential gear assembly 42, along with the wheel mount assemblies 40 at first and second ends 38, 39 of the housing assembly 10. The unified formation of the bowl portion 24 with the lower housing 14 encloses the gear 44 of the gear assembly 42 concurrently with assembly into the opening 22 of the upper housing 12.

The unified structure of the lower housing 14 reduces cost and assembly operations required for fabrication of the axle housing assembly 10. Further, the unified structure of the lower housing 14 eliminates the number of parts and the number of joint forming the housing assembly 10. The elimination of additional parts and joints reduces potential leakage points for lubricant contained within the chamber 48. In addition, the unified bowl portion 24 increases the structural rigidity of the overall axle housing assembly 10 to improving function and durability properties.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of fabricating an axle housing assembly, said method comprising the steps of:
   a) plastically deforming a first sheet of material to form an upper housing, said upper housing including first and second upper leg portions extending from a mount section to a first upper end portion and a second upper end portion respectively;
   b) plastically deforming a second sheet of material to form a lower housing, said lower housing including first and second lower leg portions extending from a bowl portion to a first lower end portion and a second lower end portion respectively, said bowl portion extending outwardly from said first and second lower leg portions;
   c) joining said upper housing to said lower housing along a first weld seam and a second weld seam that are disposed within a common horizontal plane when said axle housing is mounted on a vehicle; and
   d) attaching a first wheel mount that directly supports a rotatable wheel to a first end portion comprising the first upper end portion and the first lower end portion, and attaching a second wheel mount that directly supports a rotatable wheel to a second end portion comprising the second upper end portion and the second lower end portion such that said upper housing and said lower housing each extend from said first wheel mount to said second wheel mount, and said upper housing is mounted vertically above said lower housing when said axle housing is mounted on a vehicle, and where said step (c) comprises welding uninterrupted along the first weld seam and the second weld seam from said first wheel mount to said second wheel mount.

2. The method of claim 1, wherein step a) comprises forming a gear assembly chamber between said upper and lower housings and an opening to said gear assembly chamber within the mount section.

3. The method of claim 2, wherein step c) comprises joining said bowl portion opposite said opening.

4. The method of claim 3, wherein step b) comprises forming a longitudinal surface as part of said lower housing and extending said bowl portion outwardly beyond said longitudinal surface.

5. The method of claim 4, including the step of installing a gear assembly having a gear into said gear assembly chamber.

6. The method of claim 5, comprising the step of enclosing said gear assembly within said upper and lower housings while installing said gear assembly.

7. The method of claim 6, further defined as extending a portion of said gear assembly past said longitudinal surface.

8. The method of claim 1, wherein said step b) comprises forming said first and second lower leg portions and said bowl portion as a single unified structure that extends from said first wheel mount to said second wheel mount.

9. The method of claim 8, wherein said step c) comprises joining said first and second upper leg portions and said first and second lower leg portions to form openings at the first and second end portions, respectively.

10. The method of claim 1, wherein steps a) and b) comprise a stamping operation.

11. The method of claim 1, wherein said first wheel mount and said second wheel mount support wheels that are rotatable relative to said upper housing and said lower housing.

12. The method as recited in claim 1, including the steps of installing a gear assembly within said bowl portion, attaching a first drive element between said gear assembly and said first wheel mount and a second drive element between said gear assembly and said second wheel mount, wherein the first upper leg portion and the first lower leg portion cover a substantial length of said first drive element, and said second upper leg portion and said second lower leg portion cover a substantial length of said second drive element.

13. The method as recited in claim 12, wherein the first and second drive elements comprise first and second axle shafts.

14. The method of claim 1 wherein said upper housing comprises a single-piece component that extends uninterrupted from said first wheel mount to said second wheel mount and wherein said lower housing comprises a single piece component that extends uninterrupted from said first wheel mount to said second wheel mount.

15. The method of claim 14 wherein said first and second wheel mounts are spindles.

16. The method of claim 1 wherein said first and second upper leg portions extend uninterrupted from said mount section to said first and said second upper end portions that are directly attached to said first and said second wheel mounts, respectfully, and wherein said first and said second lower leg portions extend uninterrupted from said bowl portion to said first and said second lower ends portions that are directly attached to said first and said second wheel mounts, respectfully.

17. The method of claim 1 wherein said first and said second weld seams extend uninterrupted from the first end portion to the second end portion.

18. A method of fabricating an axle housing assembly comprising the steps of:
   a) plastically deforming a first sheet of material to form an upper housing, the upper housing including a first upper end and a second upper end;
   b) plastically deforming a second sheet of material to form a lower housing, the lower housing including a first lower end and a second lower end;
   c) joining the upper housing to the lower housing along a first seam and a second seam that are disposed in a common horizontal plane when said axle housing is mounted on a vehicle such that the first upper end is joined to the first lower end to form a first end and the second upper end is joined to the second lower end to form a second end, and including welding the first seam and the second seam uninterrupted from the first end to the second end; and
   d) attaching a first wheel mount to directly support a first rotatable wheel to the first end and a second wheel mount to directly support a second rotatable wheel to the second end such that the upper housing and the lower housing extend from the first wheel mount to the second wheel mount.

19. The method as recited in claim 18, including the step of mounting a gear assembly into the axle housing assembly and coupling a first drive element to the first wheel mount and a second drive element to the second wheel mount and the gear assembly, wherein the first drive element and the second drive element are substantially enclosed by the upper housing and the lower housing.

20. The method as recited in claim 18, wherein said first seam and said second seam are disposed longitudinally between the upper housing and the lower housing.

21. The method as recited in claim 18, wherein said step (b) includes forming a bowl portion within said lower housing centrally between said first lower end and said second lower end.

22. The method of claim 18 wherein said upper housing comprises a single-piece component that extends uninterrupted between said first and said second upper ends and wherein said lower housing comprises a single piece component that extends uninterrupted between said first and said second lower ends, and wherein said first upper end and said first lower end are directly attached to said first wheel mount and said second upper end and said second lower end are directly attached to said second wheel mount.

23. The method of claim 22 wherein said first and second wheel mounts are spindles and wherein said first and said second weld seams extend uninterrupted from the first end portion to the second end portion.

24. A method of fabricating an axle housing assembly, said method comprising the steps of:
   a) plastically deforming a first sheet of material to form an upper housing, said upper housing including first and second upper leg portions extending from a mount section to a first upper end portion and a second upper end portion respectively, wherein said mount section includes an opening to receive a gear assembly;
   b) plastically deforming a second sheet of material to form a lower housing, said lower housing including first and second lower leg portions extending from a bowl portion to a first lower end portion and a second lower end portion respectively, said bowl portion extending outwardly from said first and second lower leg portions, and wherein said bowl portion is formed as one-piece with said first and second lower leg portions and extends between said first and second lower leg portions to enclose one side of said opening in said upper housing;
   c) joining said upper housing to said lower housing along a first weld seam and a second weld seam that are disposed within a common horizontal plane when said axle housing is mounted on a vehicle; and
   d) attaching a first wheel mount to a first end portion comprising the first upper end portion and the first lower end portion, and attaching a second wheel mount member to a second end portion comprising the second upper end portion and the second lower end portion such that said upper housing and said lower housing each extend from said first wheel mount to said second wheel mount, and said upper housing is mounted vertically above said lower housing when said axle housing is mounted on a vehicle.

25. A method of fabricating an axle housing assembly, said method comprising the steps of:
   a) plastically deforming a first sheet of material to form an upper housing, said upper housing including first and second upper leg portions extending from a mount section to a first upper end portion and a second upper end portion respectively;
   b) plastically deforming a second sheet of material to form a lower housing, said lower housing including first and second lower leg portions extending from a bowl portion to a first lower end portion and a second lower end portion respectively, said bowl portion extending outwardly from said first and second lower leg portions;
   c) joining said upper housing to said lower housing along a first weld seam and a second weld seam that are disposed within a common horizontal plane when said axle housing is mounted on a vehicle, and including welding the first seam and the second seam uninterrupted from the first end portion to the second end portion; and
   d) attaching a first wheel mount to a first end portion comprising the first upper end portion and the first lower end portion, and attaching a second wheel mount member to a second end portion comprising the second upper end portion and the second lower end portion such that said upper housing and said lower housing each extend from said first wheel mount to said second wheel mount, and said upper housing is mounted vertically above said lower housing when said axle housing is mounted on a vehicle.

26. The method as recited in claim 25, wherein said first seam and said second seam are disposed longitudinally between the upper housing and the lower housing.

* * * * *